US010107651B2

United States Patent
Yaman et al.

(10) Patent No.: US 10,107,651 B2
(45) Date of Patent: Oct. 23, 2018

(54) LOW-COMPLEXITY BRILLOUIN OPTICAL TIME-DOMAIN REFLECTOMETERS USING SYB-NYQUIST SAMPLING

(71) Applicant: NEC Laboratories America, Inc., Princeton, NJ (US)

(72) Inventors: Fatih Yaman, Princeton, NJ (US); Shaoliang Zhang, Princeton, NJ (US); Ezra Ip, West Windsor, NJ (US); Yue-Kai Huang, Princeton, NJ (US); Giovanni Milione, Franklin Square, NY (US)

(73) Assignee: NEC Corporation (JP)

(*) Notice: Subject to any disclaimer, the term of this patent is extended or adjusted under 35 U.S.C. 154(b) by 0 days.

(21) Appl. No.: 15/811,061

(22) Filed: Nov. 13, 2017

(65) Prior Publication Data

US 2018/0136016 A1 May 17, 2018

Related U.S. Application Data

(60) Provisional application No. 62/422,876, filed on Nov. 16, 2016.

(51) Int. Cl.
*G01N 21/00* (2006.01)
*G01D 5/353* (2006.01)
*G01M 11/00* (2006.01)

(52) U.S. Cl.
CPC ..... *G01D 5/35364* (2013.01); *G01M 11/3118* (2013.01); *G01M 11/3145* (2013.01); *G01M 11/3154* (2013.01)

(58) Field of Classification Search
CPC .......... G01M 11/3118; G01M 11/3145; G01M 11/3154; G01D 5/35364

USPC ......................................................... 356/73.1
See application file for complete search history.

(56) References Cited

U.S. PATENT DOCUMENTS

| 2013/0025374 A1* | 1/2013 | Voskoboinik | G01D 5/35303 73/655 |
| 2018/0006722 A1* | 1/2018 | Ngo | H04B 10/07957 |
| 2018/0058197 A1* | 3/2018 | Barfoot | E21B 47/102 |

OTHER PUBLICATIONS

X. Bao, "Recent progress in distributed fiber optic sensors," Sensors 12, (Jun. 2012), pp. 8601-8639.

Izumita et al., "Brillouin OTDR employing optical frequency shifter using side-band generation technique with high-speed LN phase-modulator," IEEE Photonics Technology Letters, v28, (Dec. 1996), pp. 1674-1676.

Sally M. Maughan, "Distributed fiber sensing using microwave heterodyne detection of spontaneous Brillouin backscatter," PhD dissertation, Faculty of engineering and applied science, University of Southampton, Section III, (Sep. 2001), p. 64.

* cited by examiner

*Primary Examiner* — Sunghee Y Gray
(74) *Attorney, Agent, or Firm* — Joseph Kolodka

(57) ABSTRACT

Methods and systems for Brillouin optical time-domain reflectometry include optically filtering out non-Brillouin signals reflected from a fiber. Brillouin signals reflected from the fiber are coupled with a local oscillator to produce a Brillouin shift signals. The Brillouin shift signals are converted to an electrical domain using a photodetector. The electrical Brillouin shift signals are converted to a digital domain using a low-speed analog-to-digital converter that has a sampling rate below a Nyquist rate sufficient to fully resolve the electrical Brillouin shift signals.

12 Claims, 7 Drawing Sheets

LOW-COMPLEXITY BRILLOUIN OPTICAL TIME-DOMAIN REFLECTOMETERS USING SYB-NYQUIST SAMPLING

RELATED APPLICATION INFORMATION

This application claims priority to Ser. No. 62/422,876 filed on Nov. 16, 2016, incorporated herein by reference herein its entirety.

BACKGROUND

Technical Field

The present invention relates to time-domain reflectometry in optical fibers and, more particularly, to Brillouin optical time-domain reflectometry using sub-Nyquist analog-to-digital conversion.

Description of the Related Art

Optical reflectometry is used to sense environmental perturbations (e.g., acoustic vibrations, changes in pressure, changes in temperature, etc.) along the length of an optical fiber. These perturbations cause local changes in the index of refraction of the fiber, causing partial reflection of launched signals. By measuring the time that elapses between launching the signal and receiving the reflection(s), the location of the perturbation(s) can be determined.

Existing implementations of Brillouin time-domain reflectometry are particularly expensive due to a need for very high bandwidth receivers or downconverting received reflection signals to a baseband frequency, necessitating either a costly high-speed analog-to-digital converter or a complicated receiver architecture.

SUMMARY

A method for Brillouin optical time-domain reflectometry includes optically filtering out non-Brillouin signals reflected from a fiber. Brillouin signals reflected from the fiber are coupled with a local oscillator to produce a Brillouin shift signals. The Brillouin shift signals are converted to an electrical domain using a photodetector. The electrical Brillouin shift signals are converted to a digital domain using a low-speed analog-to-digital converter that has a sampling rate below a Nyquist rate sufficient to fully resolve the electrical Brillouin shift signals.

A system for Brillouin optical time-domain reflectometry includes an optical filter configured to filter out non-Brillouin signals reflected from a fiber. A coupler is configured to couple Brillouin signals reflected from the fiber with a local oscillator to produce a Brillouin shift signals. A photodetector is configured to convert the Brillouin shift signals to an electrical domain. A low-speed analog-to-digital converter is configured to convert the electrical Brillouin shift signals to a digital domain with a sampling rate below a Nyquist rate sufficient to fully resolve the electrical Brillouin shift signals.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Embodiments of the present invention avoids the use of a high-speed analog-to-digital converter (ADC) by operating an ADC in an aliased mode. Thus the present embodiments do not convert the signal into the digital domain with complete fidelity and partially give up the ability to digitally remove out-of-band noise, but in exchange the cost and complexity of the receiver architecture is substantially reduced.

Figure 1:
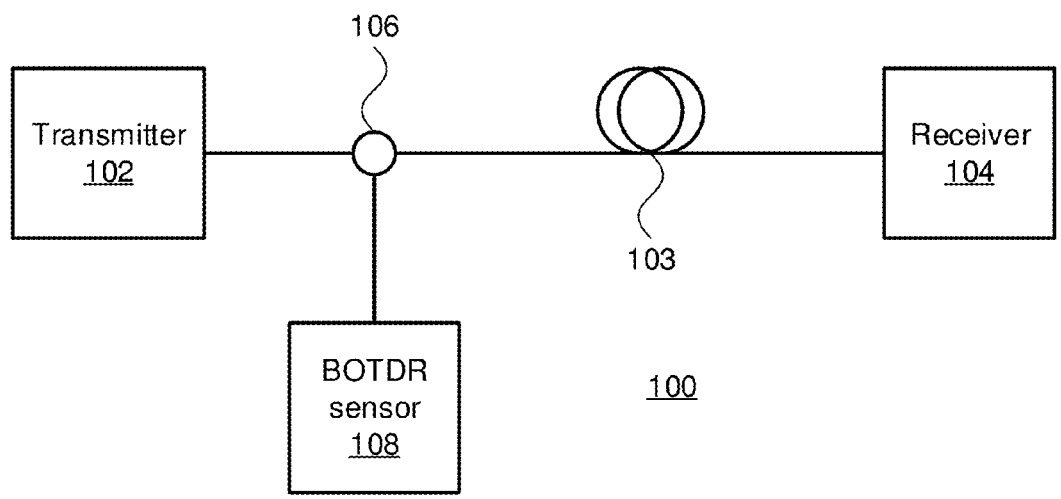
FIG. 1 is a block diagram of a system for Brillouin optical time-domain reflectometry (BOTDR) using a low-speed analog-to-digital converter in accordance with an embodiment of the present invention.

Referring now to FIG. 1, a Brillouin optical time-domain reflectometry (BOTDR) system 100 is shown. A transmitter 102 (e.g., a laser that emits light at a particular wavelength) launches an optical signal on an optical fiber 103 to a receiver 104. Any perturbations along the fiber 103 will cause reflections back toward the transmitter. These reflections are redirected by circulator 106 toward a BOTDR sensor 108, which measures a length of time between launching the signal at the transmitter 102 and receipt of the reflections at the BOTDR sensor 108 and determines a location on the fiber 103 of the perturbations. The scattering effects that cause the reflections are known as Brillouin scattering. Other scattering effects are possible (e.g., Rayleigh scattering), but reflections from these scattering effects can be filtered out in the optical or electrical domains.

It should be understood that the transmitter 102 may include more than just a laser. It is specifically contemplated that the transmitter 102 may modulate a laser's output with a pulse waveform or some other signal waveform before launching the output onto the fiber 103. This modulation allows demodulation to be done at the receiver to calculate the reflectance at different distances. For example, it would be difficult to differentiate reflections at different distances if a continuous waveform were used, but a pulse will generate discrete reflection pulses.

It is contemplated that the fiber 103 may be any appropriate single-mode or multi-mode optical fiber that is suitable for transmission of optical signals at a wavelength emitted by the transmitter 102 as well as for optical signals at a wavelength reflected by any perturbations in the fiber 103. It is specifically contemplated that the optical fiber 103 may be formed from a material that exhibits total internal reflection at the wavelengths in question, allowing signals to propagate through the fiber 103 indefinitely, with very little loss. Amplifiers may be positioned along the length of the fiber 103 for particularly long runs, including for example erbium doped fiber amplifiers or any other appropriate amplification mechanism.

Although the use of a circulator 106 is specifically contemplated to redirect the reflected signals to the BOTDR sensor 108, it should be understood that other components may be used in the place of such a circulator, including for example partially mirrored surfaces. An optical circulator is a passive device that separates optical signals traveling in different directions on fiber 103, where light entering any port of the circulator 106 exits from the next port. As a result, light from the direction of the transmitter 102 only leaves the circulator 106 in the direction of the receiver 104, while light from the direction of the receiver 104 only leaves the circulator 106 in the direction of the BOTDR sensor 108.

As noted above, Brillouin scattering is related to the index of refraction of the fiber 103, which can change over the length of the fiber due to changes in physical stresses, temperature variations, and other perturbations. In particular, Brillouin scattering characterizes the interactions between the photons of the launched signal and phonons (mass oscillation modes) and polarons (charge displacement modes) of the fiber medium. As a result, sensing based on Brillouin scattering is sensitive to more types of perturbation than other forms of detection and has superior range and accuracy. BOTDR can therefore be used to, for example, monitor power cable temperature, predict fires in high-voltage systems, optimize current loads in high-voltage systems, sense the need for de-icing in optical ground wires, and other applications.

Brillouin scattering is an inelastic process, however, with the scattered signals having a different frequency than the launched signals. An exemplary Brillouin frequency shift may be as much as, e.g., about 11 GHz, which in naïve implementations would necessitate a very large bandwidth in the BOTDR sensor 108. The BOTDR 108 measures both the power and the specific Brillouin frequency shift, with the bandwidth of the received signal being only about 100 MHz.

The Brillouin frequency shift (BFS) depends on the temperature and strain of the fiber 103. By monitoring the center of the reflected Brillouin signal, the BOTDR sensor 108 determines the temperature or the strain of the fiber 103. For example, a typical fiber will have a BFS change of about 1 MHz/° C. The bandwidth of the reflected Brillouin signal is also measured and is about 100 MHz, depending on the fiber type. The Brillouin bandwidth is orders of magnitude smaller than the BFS.

The BOTDR sensor 108 can furthermore measure temperature along the fiber 103 in a distributed fashion, where temperature variations along the entire length of the fiber 103 can be distinguished. Resolutions on the order of meters (on fibers that may be kilometers long) is possible. Each point of temperature variation causes two signatures: the first being how long it takes to receive the reflect signal and the second being the BFS of the reflected signal. The first signature indicates location of the perturbation while the second indicates the temperature. By monitoring both signatures, BOTDR sensor 108 produces an output that provides the temperature as a function of position along the fiber 103. It should be understood that, although the present embodiments are described with particular respect to temperature variations, the same principles apply to detecting variations in strain.

Figure 2:
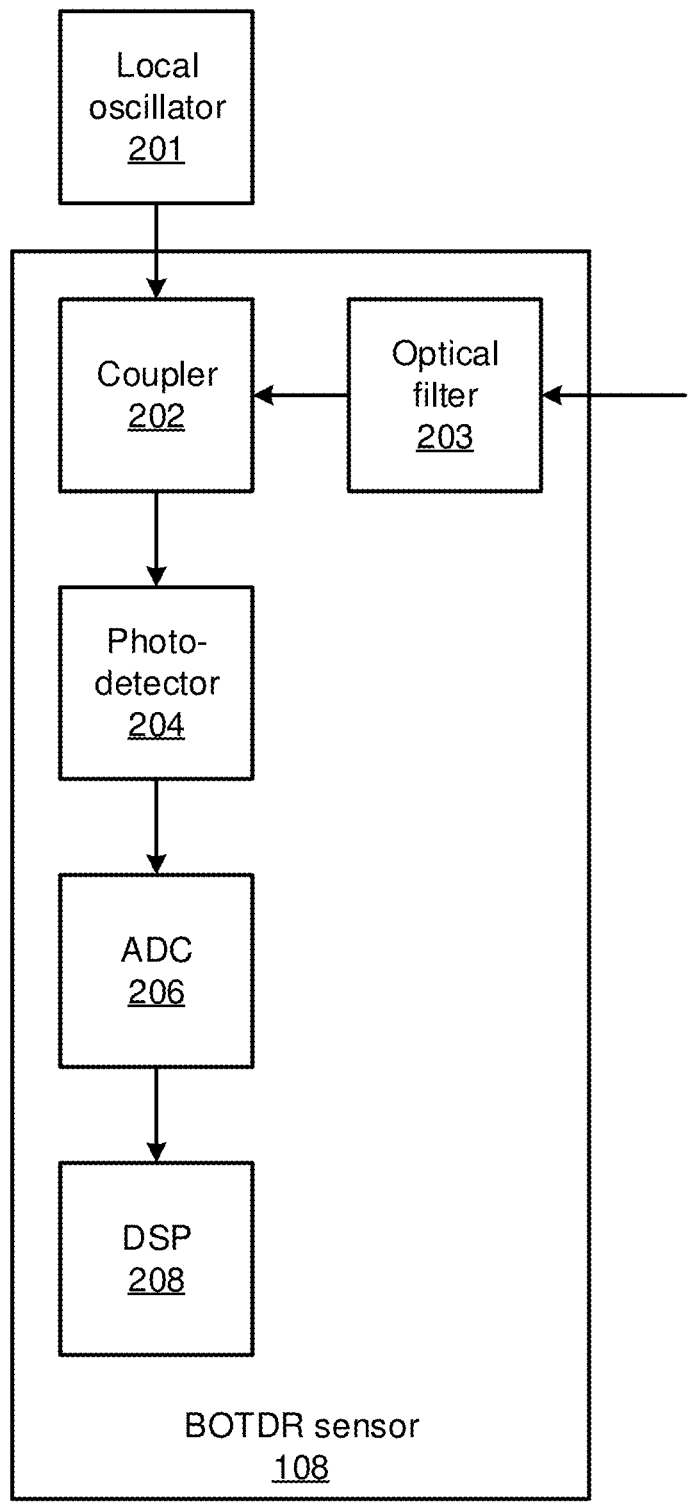
FIG. 2 is a block diagram of a BOTDR sensor in accordance with an embodiment of the present invention.

Referring now to FIG. 2, a diagram of the BOTDR sensor 108 is shown. A local oscillator 201 provides a signal from, e.g., the transmitter 102. The signal from the local oscillator is coupled with reflected signals from the fiber 103 at a coupler 202. The coupler 202 can be any appropriate optical coupler, hybrid coupler such as an optical I/Q mixer being particularly contemplated. Other embodiments may use polarization diversity hybrid couplers or integrated coherent receivers.

The reflected signals pass through an optical filter 203 to remove components outside of a desired bandwidth. The combination of the local oscillator signal and the reflected signals generates radio-frequency (RF) signals with a bandwidth in excess of about 11 GHz due to the difference in frequency between the reflected signals and the local oscillator 201. A photodetector 204 coverts the coupled optical signals to the electrical domain and an ADC 206 converts those analog electrical signals to digital signals. A digital signal processor 208 then uses the digitized Brillouin signals to determine a plot of temperature (or strain) variations along the fiber 103.

The Nyquist-Shannon sampling theorem dictates that a faithful sampling of a signal needs a sampling rate of at least twice the frequency of the signal (referred to herein as the Nyquist rate). Thus, faithfully converting the 11 GHz signal to the digital domain would necessitate an ADC 206 with a sampling rate of at least about 22 GHz. However, such high-rate ADCs are particularly expensive and would make the use of BOTDR impractical in many cases.

Another approach is to down-convert the 11 GHz signals to a baseband frequency using, e.g., an optical homodyne or an RF homodyne. However, these approaches involve substantially more complicated circuitry at the BOTDR sensor 108, which itself raises the cost. Thus, the present embodiments employ an ADC 206 that operates in an aliased mode.

Figure 3:
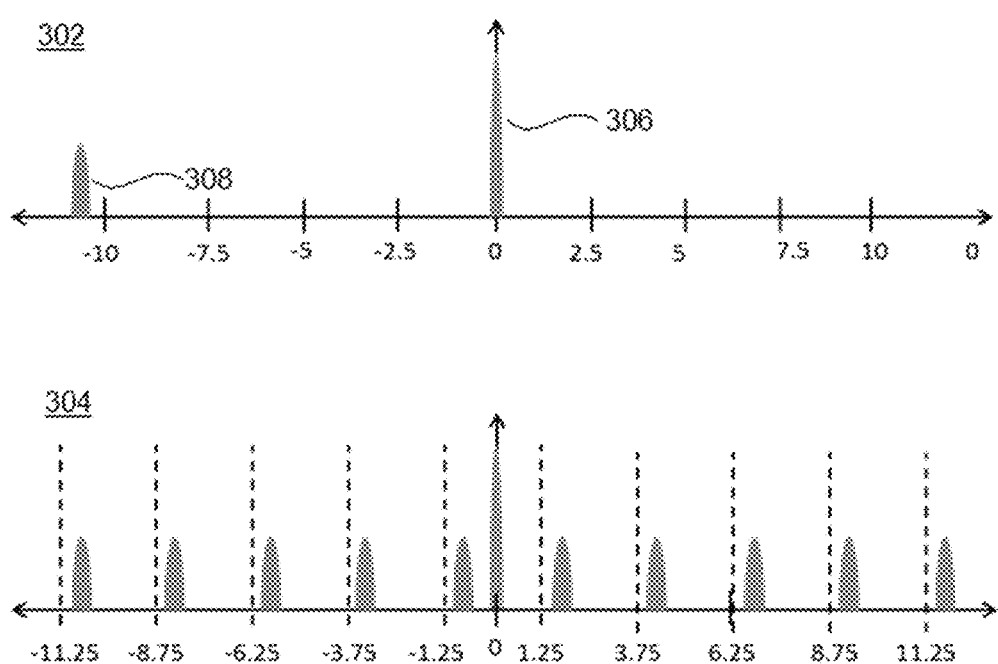
FIG. 3 is a diagram illustrating the aliasing effect of using a low-speed analog-to-digital converter in BOTDR in accordance with an embodiment of the present invention.

Referring now to FIG. 3, a comparison between a Brillouin sensing with a wide-bandwidth ADC 302 and Brillouin sensing with aliasing 304. In each case, a Rayleigh scattering signal 306 is illustrated with one or more Brillouin scattering signals 308. The horizontal axis indicates frequency differences as measured relative to the transmitter frequency in GHz, while the vertical axis indicates signal strength.

Sensing with a wide-bandwidth ADC 302, having a bandwidth in excess of about 22 GHz, avoids aliasing so that the signal spectrum is correctly represented. In this case only a single Brillouin peak 308 is seen, shifted by about 11 GHz from the transmitter frequency.

Sensing with a much smaller-bandwidth ADC 304, having a sampling rate of about 2.5 GHz, the Brillouin peak 308 is duplicated in every period. The frequency components outside the sampling frequency are folded back into the 2.5 GHz band. In other applications, where the Nyquist band (e.g., about −1.25 GHz to about 1.25 GHz) is full of signal components, folding from outside the Nyquist band will interfere with the frequency components inside the Nyquist band, since there is no way to distinguish which frequency component belongs to which, leading to a complete loss of information. In BOTDR, however, the only signal component that carries information is included in a narrow bandwidth (about 100 MHz). Anything that is left inside the Nyquist bandwidth does not carry any valuable information and may therefore be removed by optical filter 203. Thus, for example, the Rayleigh scattering component 308 can be filtered out optically. The Brillouin peak then folds back into the Nyquist band. As long as the sampling rate is selected correctly, the entire Brillouin peak will fit within the Nyquist band and the small frequency shifts due to temperature changes can be monitored.

Aliasing does cause some distortion in the spectrum. For example, the Brillouin peak would appear at −1 GHz instead of at −11 GHz. However, because it can be predicted where the Brillouin peak should appear, no valuable information is lost. Moreover, the aliased peak shifts up and down at the same rate as the true peak in response to changes from temperature or strain variations. In addition, although in certain situations aliasing could prevent digital filtering of out-of-band noise (the spectral components that do not overlap in the frequency domain with the Brillouin peak), in most BOTDR applications this out-of-band noise has a negligible impact on the signal-to-noise ratio. It should be noted that, although the 11 GHz figure will vary from fiber to fiber, this can be accounted for by changing the sampling rate or adjusting the signal processing.

To determine the sampling rate to be used, the sensing dynamic range in temperature and/or strain is first specified. A typical BFS dependency on temperature is about 1 MHz/° C. Therefore, to sense a range of 100° C., a sampling rate of 200 MHz is enough. The exact BFS location after aliasing (with sub-Nyquist sampling) will differ from one fiber type to another. However, the dynamic range in frequency is roughly similar, so that only an initial BFS frequency calibration is needed when the fiber type is changed. If Rayleigh scattering is detected along with Brillouin scattering, it is possible that the Brillouin signal may overlap with the Rayleigh signal due to aliasing. In this case, two clock settings may be used for the ADC. As long as the clock frequencies have a difference greater than the BFS dynamic range (e.g., about 100 MHz), then Rayleigh and Brillouin signal overlap can be avoided in at least one clock setting.

Figure 4:
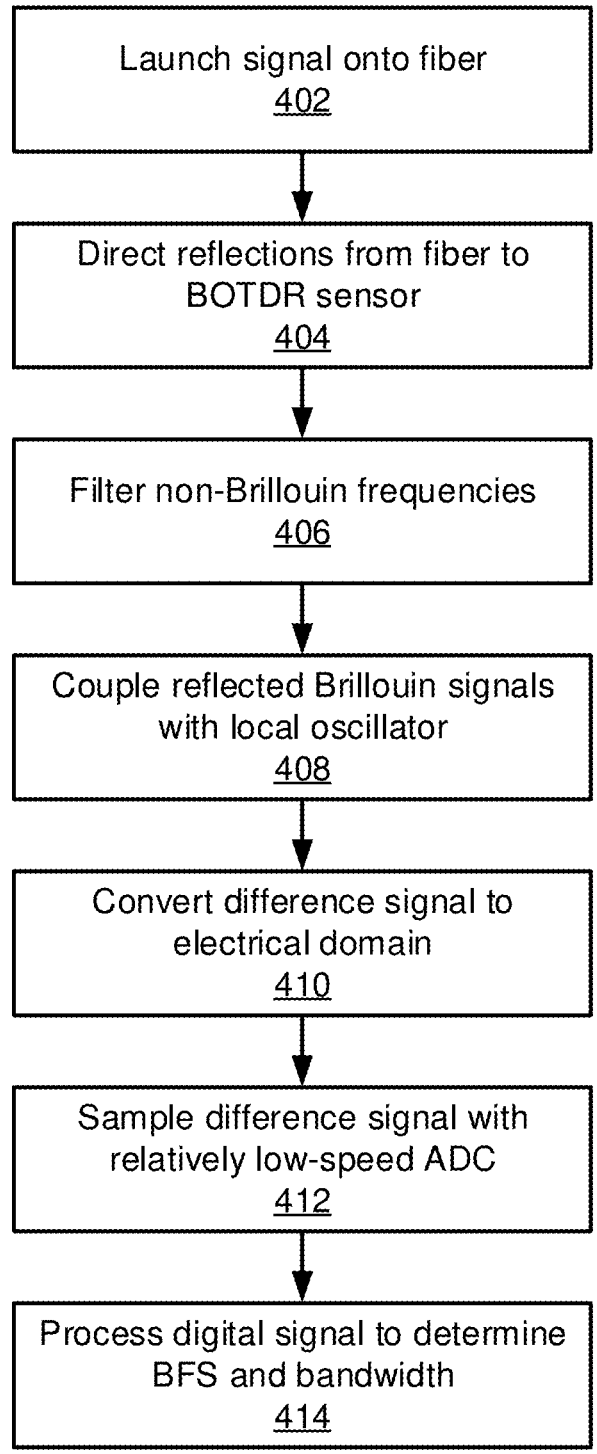
FIG. 4 is a block/flow diagram of a method of performing BOTDR using low-speed analog-to-digital conversion in accordance with an embodiment of the present invention.

Referring now to FIG. 4, a method of performing BOTDR is shown. Block 402 launches an optical signal onto a fiber 103 by a transmitter 102. It is specifically contemplated that the optical signal will be a laser pulse having a wavelength selected to have good transmission properties in the fiber 103 both for itself, and for the frequency-shifted Brillouin scattering signals. Block 404 directs such Brillouin reflections back from the fiber 103 toward the BOTDR sensor 108 using, e.g., a circulator 106. Block 406 optically filters out any wavelengths other than the Brillouin frequency-shifted wavelengths.

Block 408 couples the filtered, reflected Brillouin signals with a local oscillator signal from the transmitter 102. The difference between the two signals, at about 11 GHz, is converted to the electrical domain in photodetector 204 by block 410. Block 412 samples the difference signal with a relatively low-speed ADC 206, for example having a sample rate of about 2.5 GHz. Block 414 then processes the digital signal to determine the BFS and bandwidth of the reflected signals, providing values for the temperature (or strain) variations across the length of the fiber.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

Figure 5:
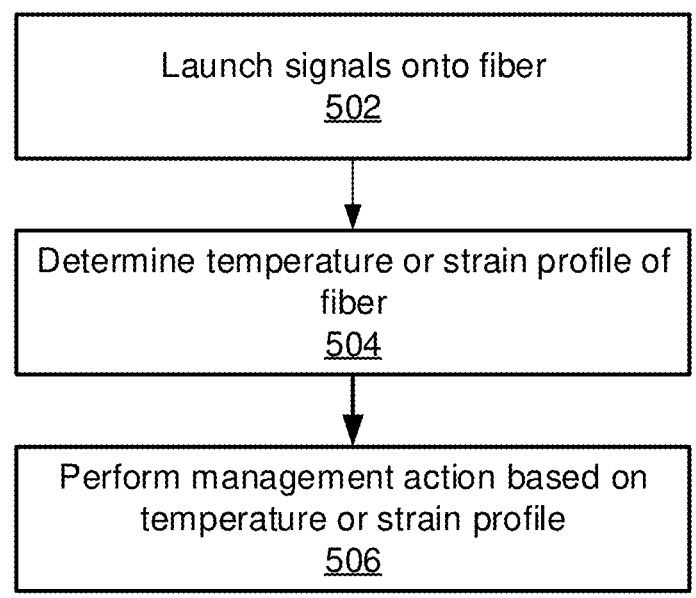
FIG. 5 is a block/flow diagram of a method of system management using BOTDR in accordance with an embodiment of the present invention.

Referring now to FIG. 5, a method of system management based on BOTDR is shown. Block 502 launches a test signal onto a fiber 103. It should be understood that the fiber 103 can be used for data transmission purposes or may, alternatively, be used solely for diagnostic/monitoring purposes. Block 504 then determines the temperature or strain profile of the fiber 103 as described above.

These profiles provide significant diagnostic information regarding the environment of the fiber 103, with particular location information that can help localize trouble spots anywhere along a many-kilometer long run of fiber. Block 506 therefore automatically performs a management action based on the temperature or strain profile, for example engaging a cooling system or a de-icing system if a temperature profile indicates a high- or low-temperature condition or sending a repair team if a strain profile indicates damage to the fiber.

Figure 6:
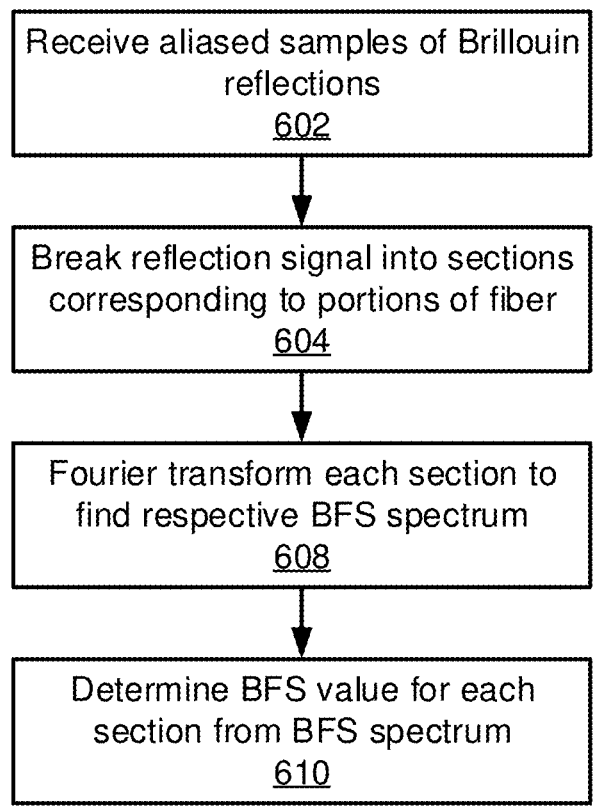
FIG. 6 is a block/flow diagram of a method of determining a Brillouin shift frequency in accordance with an embodiment of the present invention.

Referring now to FIG. 6, a method for determining the BFS in a BOTDR system is shown. Block 602 receives the aliased samples of Brillouin reflections from ADC 206. Block 604 breaks the signal into time sections that correspond to different portions of the fiber 103. For example, the recorded signal may be broken into sections of about 100 ns, which would correspond to a spatial resolution in the fiber 103 of about 10 m. In the case of a fiber about 5 km long, the transmitter 102 can emit pulses with a repetition rate of about 20 kHz. In this example, the ADC 206 may have a sampling rate of about 2.5 gigasamples per second, which provides nearly 10× aliasing for the 11 GHz signal.

Block 608 performs a Fourier transform (e.g., a Fast Fourier Transform) for the signal in each time section, converting the time-domain signal into a frequency-domain signal. Block 610 then can readily determine the BFS value for that section by, e.g., finding the peak or using curve fitting. This can be performed for each section in the fiber 103, providing a breakdown of what kinds of temperature and strain variation are in each section.

Figure 7:
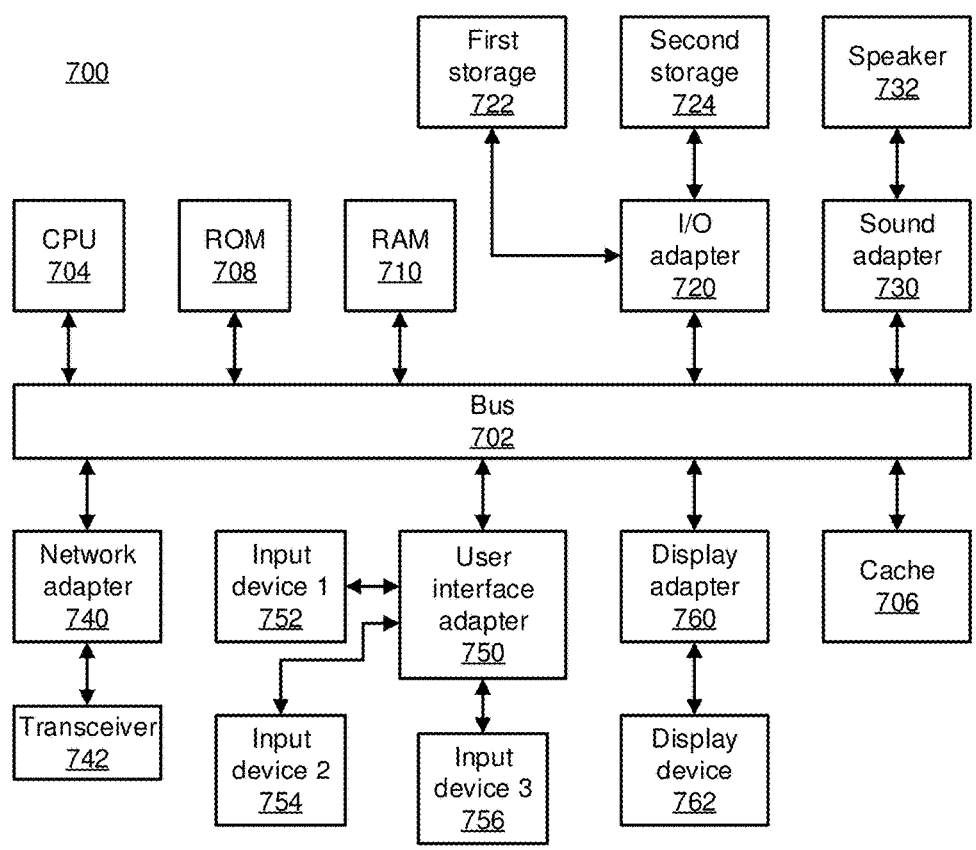
FIG. 7 is a block diagram of a processing system in accordance with an embodiment of the present invention.

Referring now to FIG. 7, an exemplary processing system 700 is shown which may represent the BOTDR sensor 108. The processing system 700 includes at least one processor (CPU) 704 operatively coupled to other components via a system bus 702. A cache 706, a Read Only Memory (ROM) 708, a Random Access Memory (RAM) 710, an input/output (I/O) adapter 720, a sound adapter 730, a network adapter 740, a user interface adapter 750, and a display adapter 760, are operatively coupled to the system bus 702.

A first storage device 722 and a second storage device 724 are operatively coupled to system bus 702 by the I/O adapter 720. The storage devices 722 and 724 can be any of a disk storage device (e.g., a magnetic or optical disk storage device), a solid state magnetic device, and so forth. The storage devices 722 and 724 can be the same type of storage device or different types of storage devices.

A speaker 732 is operatively coupled to system bus 702 by the sound adapter 730. A transceiver 742 is operatively coupled to system bus 702 by network adapter 740. A display device 762 is operatively coupled to system bus 702 by display adapter 760.

A first user input device 752, a second user input device 754, and a third user input device 756 are operatively coupled to system bus 702 by user interface adapter 750. The user input devices 752, 754, and 756 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 752, 754, and 756 can be the same type of user input device or different types of user input devices. The user input devices 752, 754, and 756 are used to input and output information to and from system 700.

Of course, the processing system 700 may also include other elements (not shown), as readily contemplated by one of skill in the art, as well as omit certain elements. For example, various other input devices and/or output devices can be included in processing system 700, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 700 are readily contemplated by one of ordinary skill in the art given the teachings of the present principles provided herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for Brillouin optical time-domain reflectometry, comprising:
    optically filtering out non-Brillouin signals reflected from a fiber;
    coupling Brillouin signals reflected from the fiber with a local oscillator to produce a Brillouin shift signals;
    converting the Brillouin shift signals to an electrical domain using a photodetector; and
    converting the electrical Brillouin shift signals to a digital domain using a low-speed analog-to-digital converter that has a sampling rate below a Nyquist rate sufficient to fully resolve the electrical Brillouin shift signals; and
    determining a temperature or strain variation profile of the fiber based on the digital Brillouin shift signals by splitting the digital-domain Brillouin shift signals into a series of time-sections corresponding to sections of the fiber and determining a Brillouin frequency shift for each time section.

2. The method of claim 1, further comprising launching optical pulses onto the fiber from a transmitter.

3. The method of claim 2, wherein the optical pulses are laser pulses.

4. The method of claim 1, wherein optically filtering out non-Brillouin signals comprises filtering out Rayleigh scattering signals.

5. The method of claim 1, wherein determining the temperature or strain variation profile of the fiber comprises determining a Brillouin frequency shift and a bandwidth of the Brillouin signals reflected from the fiber.

6. The method of claim 1, further comprising performing a management action based on the temperature or strain variation profile of the fiber.

7. A system for Brillouin optical time-domain reflectometry, comprising:
    an optical filter configured to filter out non-Brillouin signals reflected from a fiber;
    a coupler configured to couple Brillouin signals reflected from the fiber with a local oscillator to produce a Brillouin shift signals;
    a photodetector configured to convert the Brillouin shift signals to an electrical domain;
    a low-speed analog-to-digital converter configured to convert the electrical Brillouin shift signals to a digital domain with a sampling rate below a Nyquist rate sufficient to fully resolve the electrical Brillouin shift signals; and
    a digital signal processor configured to determine a temperature or strain variation profile of the fiber based on the digital Brillouin shift signals, to split the digital-domain Brillouin shift signals into a series of time-sections corresponding to sections of the fiber and to determine a Brillouin frequency shift for each time section.

8. The system of claim 7, further comprising a transmitter configured to launch optical pulses onto the fiber.

9. The system of claim 8, wherein the optical pulses are laser pulses.

10. The system of claim 7, wherein the optical filter is configured to filter out Rayleigh scattering signals.

11. The system of claim 7, the digital signal processor is further configured to determine a Brillouin frequency shift and a bandwidth of the Brillouin signals reflected from the fiber.

12. The system of claim 7, further comprising a management module configured to perform a management action based on the temperature or strain variation profile of the fiber.

\* \* \* \* \*